(12) United States Patent
Annas

(10) Patent No.: US 7,682,555 B2
(45) Date of Patent: Mar. 23, 2010

(54) SUCTION CART FOR SUCTIONING OFF THE GASES AND DUST PRODUCED DURING FLAME CUTTING PROCESSES

(75) Inventor: Heinz-Josef Annas, Unna (DE)

(73) Assignee: Lufttechnik Horst Ludscheidt KG, Dortmund (DE)

(*) Notice: Subject to any disclaimer, the term of this patent is extended or adjusted under 35 U.S.C. 154(b) by 0 days.

(21) Appl. No.: 12/218,495

(22) Filed: Jul. 15, 2008

(65) Prior Publication Data

US 2009/0039571 A1 Feb. 12, 2009

Related U.S. Application Data

(63) Continuation of application No. PCT/EP2008/000361, filed on Jan. 18, 2008.

(30) Foreign Application Priority Data

Aug. 10, 2007 (DE) ........................ 10 2007 037 786

(51) Int. Cl.
*B23K 7/10* (2006.01)
(52) U.S. Cl. ........................ 266/49; 266/135
(58) Field of Classification Search ............... 266/48, 266/49, 135
See application file for complete search history.

(56) References Cited

U.S. PATENT DOCUMENTS

| 4,058,299 | A | | 11/1977 | Lindkvist | |
|---|---|---|---|---|---|
| 6,039,915 | A | * | 3/2000 | Minter et al. | 266/49 |
| 6,165,410 | A | * | 12/2000 | Crees et al. | 266/49 |
| 7,011,789 | B1 | * | 3/2006 | Bowlin et al. | 266/49 |

FOREIGN PATENT DOCUMENTS

| DE | 204 868 | 12/1983 |
|---|---|---|
| DE | 195 21 110 | 1/1996 |
| EP | 0 213 235 | 3/1987 |
| EP | 0 288 598 | 11/1988 |
| FR | 2 320 161 | 3/1977 |

OTHER PUBLICATIONS

International Search Report (in German).

* cited by examiner

*Primary Examiner*—Scott Kastler
(74) *Attorney, Agent, or Firm*—Collard & Roe, P.C.

(57) ABSTRACT

A suction cart suctions away the gases and dust produced during flame cutting processes and catches the scrap metal produced. The suction cart can travel underneath the flame cutting bench and is outfitted with at least one suction pipe, which emerges into a suction duct, is configured so that it is able to handle the disposal work for materials located underneath the flame cutting bench. A cleaning blade or rake is arranged on the suction cart, the cleaning blade or rake being able to be lifted and lowered onto the floor underneath the flame cutting bench.

5 Claims, 3 Drawing Sheets

SUCTION CART FOR SUCTIONING OFF THE GASES AND DUST PRODUCED DURING FLAME CUTTING PROCESSES

CROSS REFERENCE TO RELATED APPLICATIONS

Applicant claims priority under 35 U.S.C. §119 of German Application No. 10 2007 037 786.1 filed Aug. 10, 2007. Applicant also claims priority and this application is a continuation under 35 U.S.C. §120 of International Application No. PCT/EP2008/000361, filed on Jan. 18, 2008, which claims priority under 35 U.S.C. §119 of German Application No. 10 2007 037 786.1 filed Aug. 10, 2007. The international application under PCT article 21(2) was not published in English.

BACKGROUND OF THE INVENTION

1. Field of the Invention

The present invention relates to a suction cart for suctioning away the gases and dust produced during flame cutting processes and for catching the scrap metal produced, wherein the suction cart can travel underneath the flame cutting bench and is outfitted with at least one suction pipe, which emerges into a suction duct.

2. The Prior Art

Suction carts of this type are known, for example, from EP-0 288 598-B of the applicant. In this known suction cart, rails are laid under the flame cutting bench, on which is positioned a traversing gear of such a suction hood, while the suction hood can be synchronized with the movement of the flame burner. Specifically, the suction hood is always automatically located at the spot where the torch is cutting, so as to suction away the gases and dust and possibly catch any material dropping down.

It has been found in practice that burned-off pieces of metal are constantly falling outside the position of the suction cart under the flame cutting bench, so that they have to be removed at certain distances. For this removal, it is sometimes necessary for people to climb underneath the flame cutting bench to collect and remove the metal pieces there.

SUMMARY OF THE INVENTION

Against this background, it is an object of the present invention to provide a suction cart able to handle the disposal work of materials located underneath the flame cutting bench.

These and other objects are accomplished, according to the invention, by arranging on a suction cart of the kind indicated above a cleaning blade or rake that is able to be lifted and lowered onto the floor underneath the flame cutting bench.

Such a cleaning blade, which can be lowered onto the floor and moved by means of the drive unit of the suction cart, can perform a cleaning motion. In this way, all materials located under the bench are gathered up and can be transported to one end or the other of the flame cutting bench, where they can be picked up and transported onward, without a person having to go underneath the flame cutting bench.

Embodiments of the invention are discussed below. It can be provided that the cleaning blade is arranged on vertical guide cylinders, which are fixed stationary on the suction cart.

Expediently, the cleaning blade is arranged so that it can be raised and lowered on the suction cart via at least one cable control. In a further embodiment, the suction cart is outfitted with at least two cable controls for raising and lowering the cleaning blade, which are effectively fastened to a lifting shaft.

In order to provide the smoothest possible surface underneath the flame cutting bench, another embodiment arranges the suction cart so that it can travel in rails suspended beneath the flame cutting bench. Another embodiment provides the rails for the suspension of the suction cart on the inwardly pointing upper T-webs of double T-beams, which bear the flame cutting bench. The suction pipes are fixed to the inner side of the respective T-web.

The turning of the lifting shaft with the cable controls can be motorized, or it can be done by a manually activated crank mechanism.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
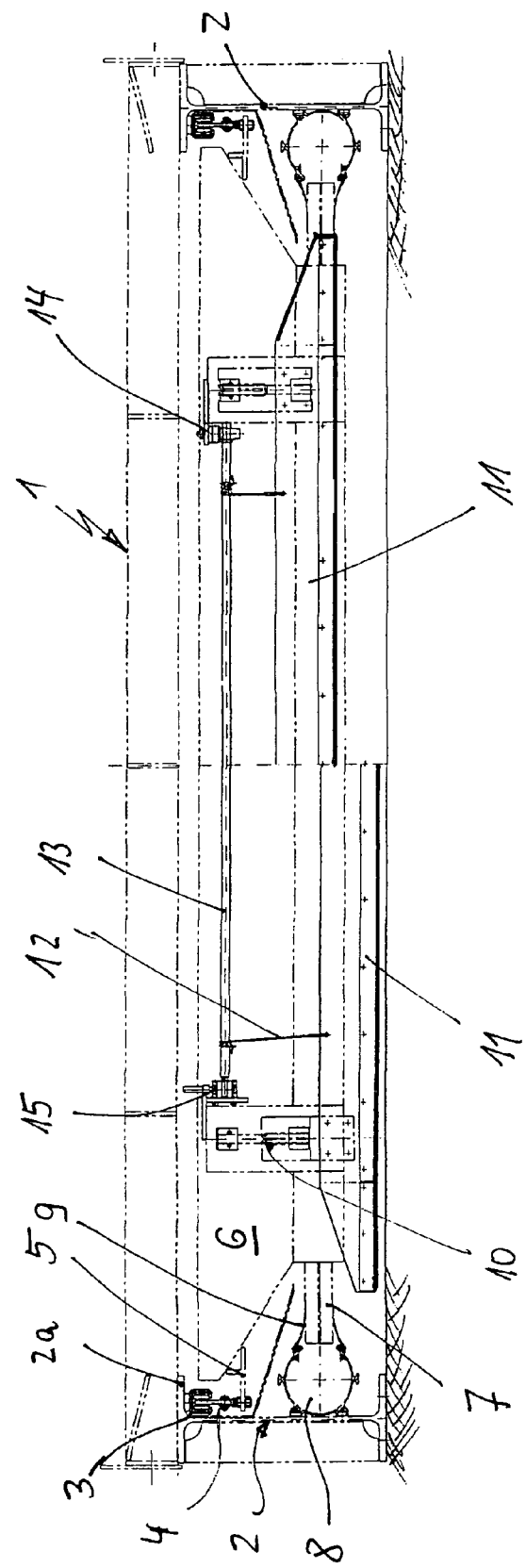
FIG. 1 is an end view of the flame cutting bench with suction cart.
Figure 2:
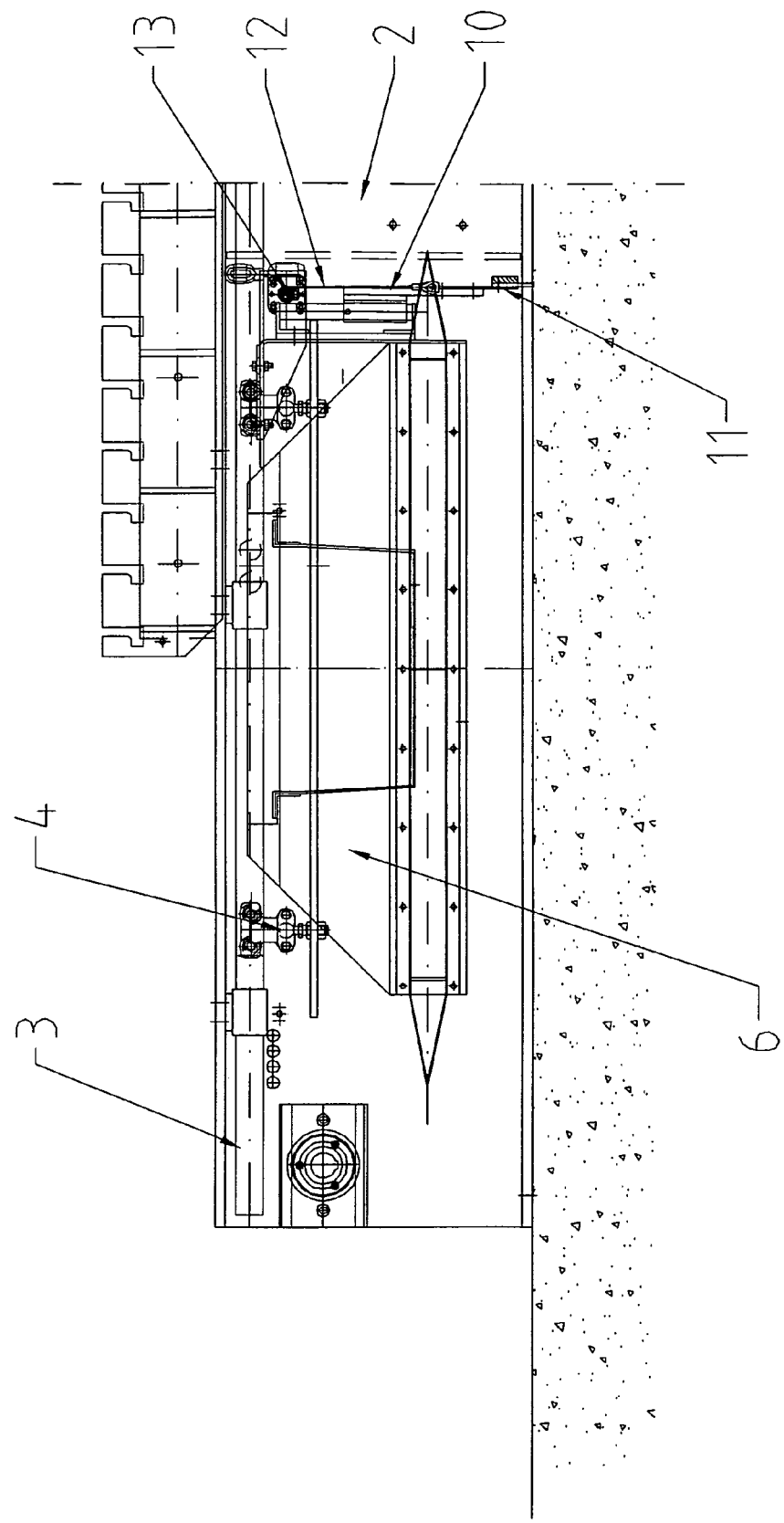
FIG. 2 is a side view of a flame cutting bench in the region of the suction cart.
Figure 3:
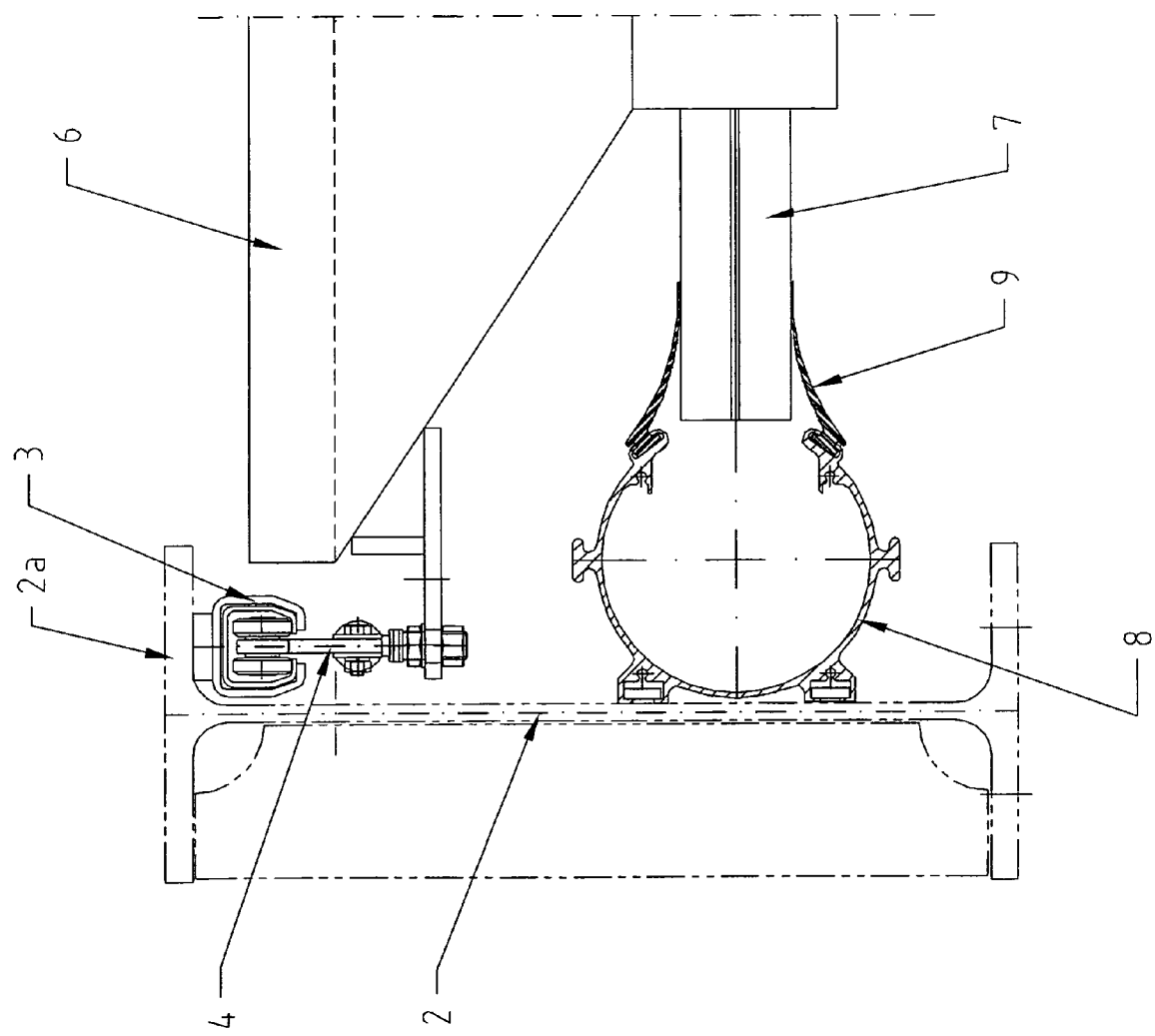
FIG. 3 is a magnified detail view of the representation according to FIG. 1.

Referring now in detail to the drawings, FIG. 1 shows a flame cutting bench generally designated as 1 resting on double-T beams 2 at its outer margins. Flame cutting bench 1 is provided with a guide and running rail 3 on the inwardly pointing upper T-webs 2a, in each of which a traversing gear 4 is guided, with a receiving mechanism 5 for a roughly funnel-shaped suction cart 6, which is outfitted with suction pipes 7 arranged in the bottom region, which lead to an exhaust pipe system 8 with sealing lips 9. One side of suction cart 6 is outfitted with a pair of guide mechanisms, such as guide cylinders 10, which carry a cleaning blade 11 at the downward pointing ends, and a pair of cable controls 12 is provided on the cleaning blade, which can be wound up or let out via a lifting shaft 13, depending on whether cleaning blade 11 is to be raised or lowered.

In FIG. 1, the left half of the figure shows cleaning blade 11 in lowered position and the right half of the figure shows cleaning blade 11 in raised position.

Lifting shaft 13 is positioned in a pedestal bearing 14, for example, at the right side of FIG. 1, while the left side is outfitted with a gearing 15, which can be moved, e.g., by means of a hand crank mechanism, in order to raise or lower cleaning blade 11.

If material that has dropped underneath flame cutting bench 1 needs to be removed, one can lower cleaning blade 11 by hand, e.g., at one end of flame cutting bench 1; the suction cart is then moved to the other side of the flame cutting bench and thereby scrapes away all materials which have fallen underneath the bench by means of the cleaning blade from the surface underneath flame cutting bench 1 and delivers these materials to the other side of the flame cutting bench, where the refuse can then be picked up and transported onward.

Of course, the described sample embodiment of the invention can be further modified in many respects, without abandoning the basic notion. Thus, for example, a coarse rake can be provided at one side of the flame cutting bench, in order to remove coarse material from underneath the bench, and a fine rake or the described cleaning blade at the other side; the raising and lowering can be done by motor, or also by means of a manual crank mechanism, as described; and much more of the kind.

Accordingly, although at least one embodiment has been shown and described, it is to be understood that many changes and modifications may be made thereunto without departing from the spirit and scope of the invention as defined in the appended claims.

What is claimed is:

1. An assembly comprising:
   (a) a flame bench;
   (b) a suction cart movable underneath the flame cutting bench for suctioning away gases and dust produced during a flame cutting process and for catching scrap metal provided during the process, said suction cart comprising a suction duct and at least one suction pipe leading to said suction duct;
   (c) a cleaning device selected from the group consisting of a cleaning blade and a cleaning rake, said cleaning device being arranged on the suction cart and raisable and lowerable onto a surface underneath the flame cutting bench;
   (d) a plurality of vertical guide cylinders fixed stationary on the suction cart, the cleaning device being arranged on said vertical guide cylinders; and
   (e) at least one cable control for raising and lowering the cleaning device on the suction cart.

2. The assembly according to claim 1, further comprising a lifting shaft, wherein the suction cart comprises at least two cable controls fastened to the lifting shaft for raising and lowering the cleaning device.

3. The assembly, according to claim 1, further comprising a plurality of rails suspended beneath the flame cutting bench, the suction cart being arranged for travel in said rails.

4. The assembly according to claim 3, further comprising a plurality of double T-beams having inwardly pointing upper T-webs bearing the flame cutting bench and a plurality of suction pipes, each suction pipe fixed to an inner side of a respective upper T-web, wherein the rails are provided on the inwardly pointing upper T-webs.

5. An assembly comprising:
   (a) a flame bench;
   (b) a suction cart movable underneath the flame cutting bench for suctioning away gases and dust produced during a flame cutting process and for catching scrap metal provided during the process, said suction cart comprising a suction duct and at least one suction pipe leading to said suction duct;
   (c) a cleaning device selected from the group consisting of a cleaning blade and a cleaning rake, said cleaning device being arranged on the suction cart and raisable and lowerable onto a surface underneath the flame cutting bench;
   (d) a plurality of vertical guide cylinders fixed stationary on the suction cart, the cleaning device being arranged on said vertical guide cylinders;
   (e) a lifting shaft, and wherein the suction cart comprises at least two cable controls fastened to the lifting shaft for raising and lowering the cleaning device; and
   (f) said lifting shaft being positioned in a pedestal bearing, at one side thereof, while another side being outfitted with a gearing, which can be moved, in order to raise or lower the cleaning device.

* * * * *